(12) United States Patent
Lee

(10) Patent No.: US 9,669,342 B2
(45) Date of Patent: Jun. 6, 2017

(54) OIL MIST COLLECTOR

(71) Applicant: Air-O-Filter Environment System, Inc., Taichung (TW)

(72) Inventor: Tung-Tsai Lee, Changhua Hsien (TW)

(73) Assignee: AIR-O-FILTER ENVIRONMENT SYSTEM INC., Taichung (TW)

( * ) Notice: Subject to any disclaimer, the term of this patent is extended or adjusted under 35 U.S.C. 154(b) by 147 days.

(21) Appl. No.: 14/728,504

(22) Filed: Jun. 2, 2015

(65) Prior Publication Data

US 2016/0354720 A1     Dec. 8, 2016

(51) Int. Cl.
    *B01D 46/00*     (2006.01)
    *B01D 50/00*     (2006.01)
    *B01D 46/24*     (2006.01)

(52) U.S. Cl.
    CPC ..... *B01D 46/0023* (2013.01); *B01D 46/0002* (2013.01); *B01D 46/003* (2013.01); *B01D 46/0024* (2013.01); *B01D 46/0031* (2013.01); *B01D 46/0084* (2013.01); *B01D 46/2411* (2013.01); *B01D 50/002* (2013.01); *B01D 2273/30* (2013.01); *B01D 2275/201* (2013.01); *B01D 2275/208* (2013.01)

(58) Field of Classification Search
    CPC ............ B01D 45/16; B01D 46/0023; B01D 46/0024; B01D 46/003; B01D 46/0031; B01D 50/002; B01D 2273/30; B01D 46/0002; B01D 46/2411; B01D 2275/201; B01D 2275/208
    USPC .......................................... 55/471, 472, 473
See application file for complete search history.

(56) References Cited

U.S. PATENT DOCUMENTS

| | | | | |
|---|---|---|---|---|
| 4,787,922 | A | * | 11/1988 | Kulitz ................. B01D 46/002 55/356 |
| 2002/0170856 | A1 | * | 11/2002 | Jaroszczyk ........... B01D 29/111 210/493.5 |
| 2013/0255501 | A1 | * | 10/2013 | Sun ........................ B01D 45/06 96/135 |

\* cited by examiner

*Primary Examiner* — Robert Clemente

(57) ABSTRACT

An oil mist collector contains a casing unit, a first filtering unit, a second filtering unit, and a ventilation unit. The casing unit includes an inlet, a first air chamber, a second air chamber, an air guiding orifice corresponding to the second air chamber and communicating with an exterior, and a first recycling orifice arranged on a bottom end thereof and communicating with the first air chamber. The first filtering unit is disposed in the first air chamber and corresponds to the inlet. The second filtering unit is fixed above the air guiding orifice and includes an open rear end, a first lip with a noncircular cross section, a second lip, and a first filtration assembly defined between the first lip and the second lip. The ventilation unit includes a motor and a rotary fan rotatably connected with the motor and secured in the second air chamber.

13 Claims, 7 Drawing Sheets

OIL MIST COLLECTOR

BACKGROUND OF THE INVENTION

1. Technical Field

The present invention relates to an air purifying apparatus, and more particularly to an oil mist collector which facilitates enhancing flow speed and flow rate of oil mists and reducing air resistance and pressure loss in a filtration process, thus enhancing filtering and recycling effect.

2. Description of Related Art

A conventional oil mist filter is mounted on a working machine to filter oil mists, dusts, smokes, and hazes which produce in working process, thus exhausting clean and fresh air.

Another conventional oil mist filter is disclosed in TW Publication No. M436140 and contains a frame, a casing, a filtering unit, a ventilation unit, and a filtration cylinder mounted outside the casing. The frame has a filtering space and a pumping space, and a bottom end of the pumping space is in connection with an oil collection space. The filtering unit is disposed in the filtering space and has an arcuate turbulent mesh, a first filtration mesh, and a second filtration mesh. The ventilation unit has a wind wheel arranged in the pumping space, and a motor is accommodated in an accommodation groove of the casing, such that the wind wheel of the ventilation unit rotates to draw the oil mists into the filtering space from an inlet, and then the oil mists are filtered and purified by the filtering unit and the filtration cylinder to exhaust clean and fresh air. Furthermore, oily substances gathered by the filtering unit are discharged out of an oil orifice on the bottom end of the filtering unit, and greases attaching in the pumping space and the casing are discharged out of the oil orifice via an inclined face on the bottom end of the collection space.

However, the oil mist filter still has following disadvantages:

1. Air flows downwardly along the inclined face of the collection space and then contacts with an inner wall of the casing to flow upwardly further. Thereafter, the air flows to the motor through the casing and then flows into the filtration cylinder from an outlet of the casing for further filtering the oil mists, thus increasing air resistance and pressure loss and reducing filtering and recycling effect.

2. The filtering unit has an arcuate air baffle for guiding the oil mists into the filtering space, and the oil mists are filtered evenly by the first filtration mesh and the second filtration mesh, however, the first filtration mesh and the second filtration mesh are stacked parallelly, the oil mists are partially stopped by the first filtration mesh and the second filtration mesh to reduce flow rate of the oil mists. In order to overcome such a problem, the motor has to rotate at a high speed to enhance the flow rate of the oil mists, so it is broken or is overheat in operation.

3. The oil mist filter does not have a pressure inductor for judging obstruction of the first filtration mesh and the second filtration mesh, so the first filtration mesh and the second filtration mesh cannot be replaced or cleaned on time.

The present invention has arisen to mitigate and/or obviate the afore-described disadvantages.

SUMMARY OF THE INVENTION

The primary objective of the present invention is to provide an oil mist collector which facilitates enhancing flow speed and flow rate of oil mists and reducing air resistance and pressure loss in a filtration process, thus enhancing filtering and recycling effect.

To obtain the above objective(s), an oil mist collector provided by the present invention contains: a casing unit, a first filtering unit, a second filtering unit, and a ventilation unit.

The casing unit includes an inlet, a first air chamber, a second air chamber, an air guiding orifice corresponding to the second air chamber and communicating with an exterior, and a first recycling orifice arranged on a bottom end thereof and communicating with the first air chamber.

The first filtering unit is disposed in the first air chamber and corresponds to the inlet.

The second filtering unit is fixed above the air guiding orifice and is formed in a hollow cylinder shape, wherein the second filtering unit includes an open rear end, a first lip with a noncircular cross section, a second lip, and a first filtration assembly defined between the first lip and the second lip.

The ventilation unit includes a motor and a rotary fan rotatably connected with the motor and secured in the second air chamber.

Thereby, after starting the motor to drive the rotary fan to rotate, a wind pressure produces to guide oil mists into the first air chamber, and a part of the oil mists is filtered in the first filtering unit, and the others of the oil mists are guided to flow into the second air chamber and then are pumped into the second filtering unit for further filtration via the air guiding orifice, thus filtering and recycling the oil mists and exhausting clean and fresh air via the first filtration assembly.

Since the air guiding orifice is located above the second air chamber and communicates with the second filtering unit, the others of the oil mists are pumped upwardly into the second filtering unit from the second air chamber smoothly. In other words, a flowing path of the air flow in the casing unit is shorten greatly to reduce the air resistance and the pressure loss, thus causing smooth exhaustion and high recycling to the oil mists.

DETAILED DESCRIPTION OF THE PREFERRED EMBODIMENTS

Figure 1:
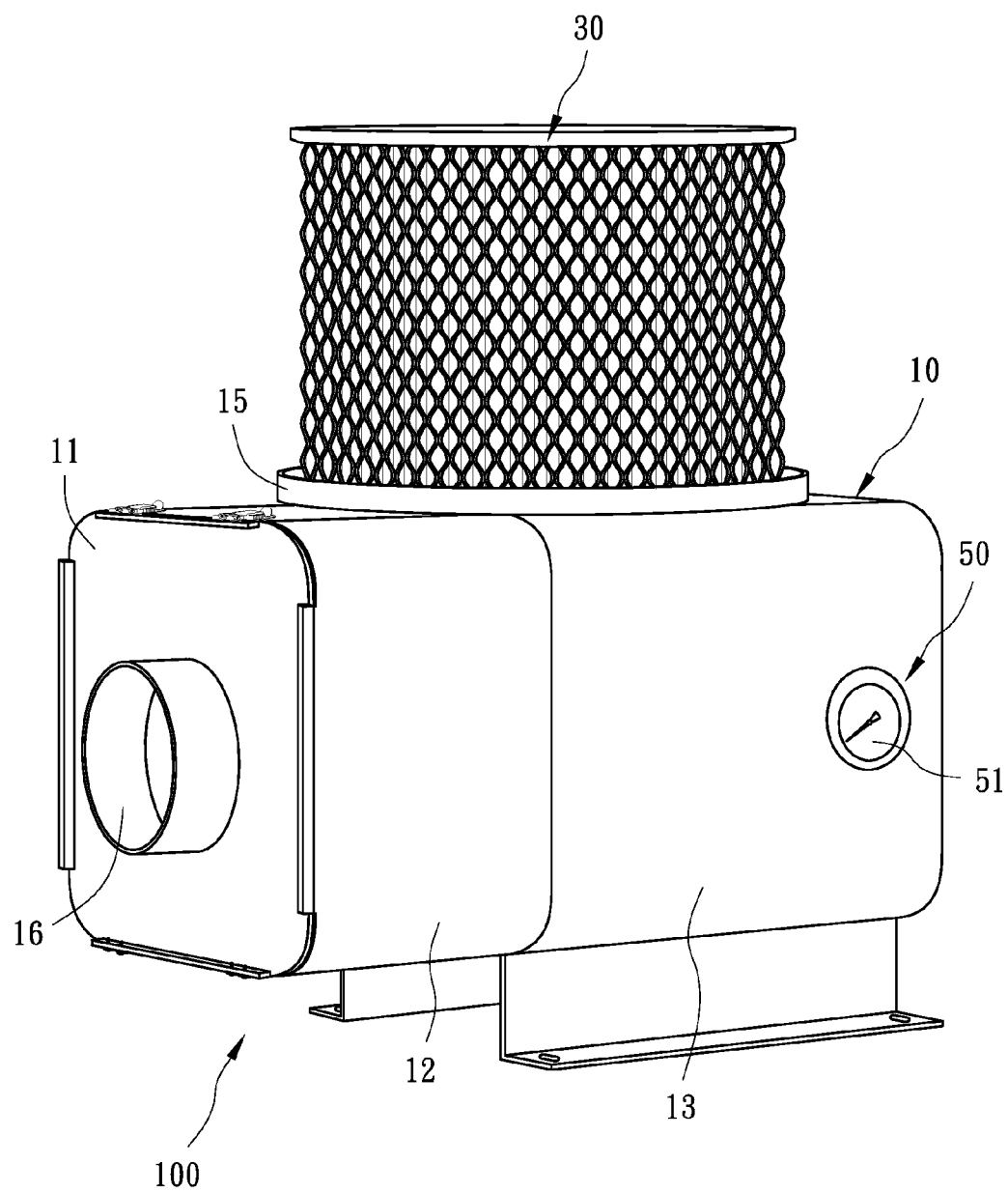
FIG. 1 is a perspective view showing the assembly of an oil mist collector according to a first embodiment of the present invention.
Figure 2:
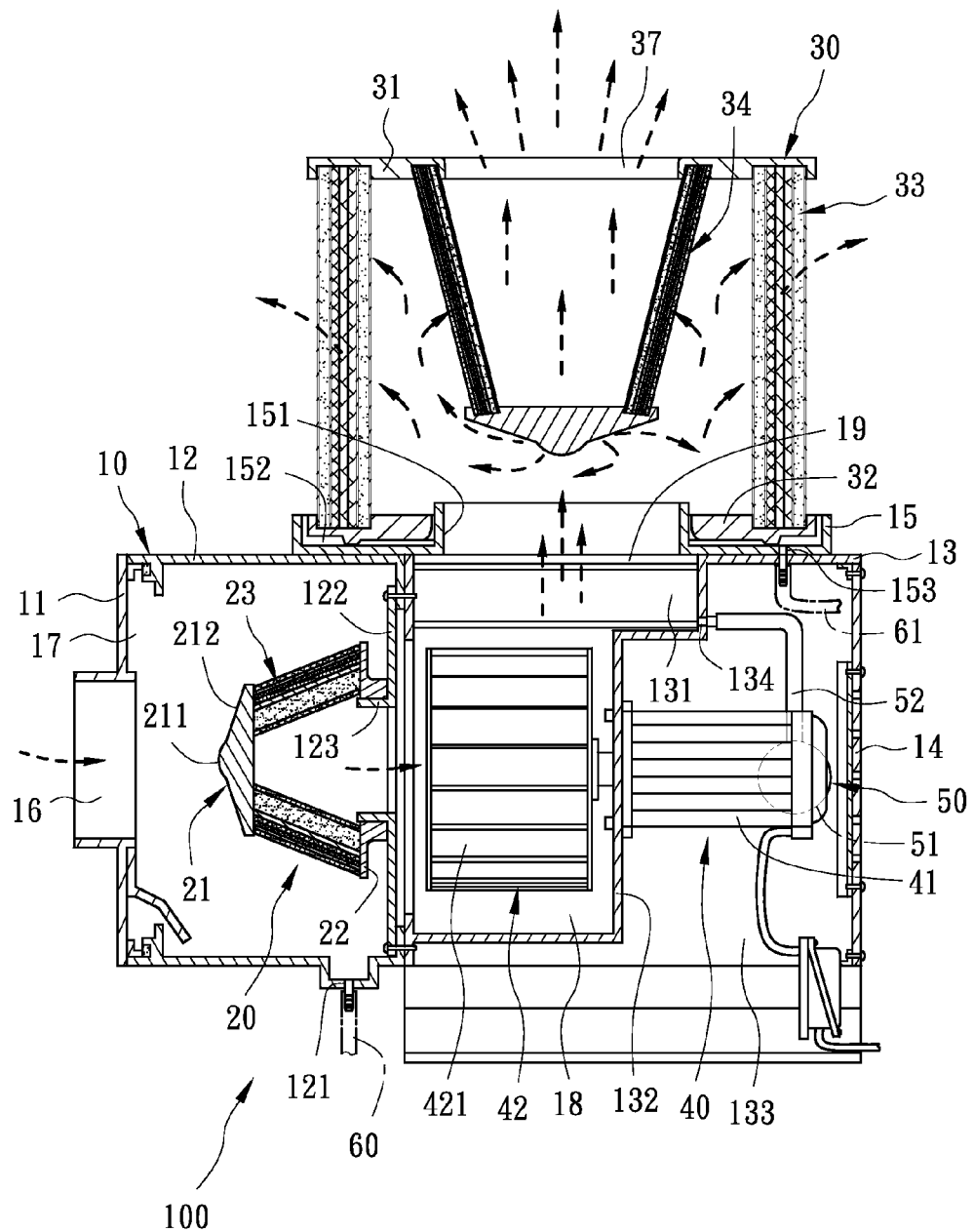
FIG. 2 is a cross sectional view showing the assembly of the oil mist collector according to the first embodiment of the present invention.

With reference to FIGS. 1 and 2, an oil mist collector 100 according to a first embodiment of the present invention is fixed on a work table of a machine (not shown). The oil mist collector 100 comprises: a casing unit 10, a first filtering unit 20, a second filtering unit 30, a ventilation unit 40, and a pressure indicator 50.

Figure 3:
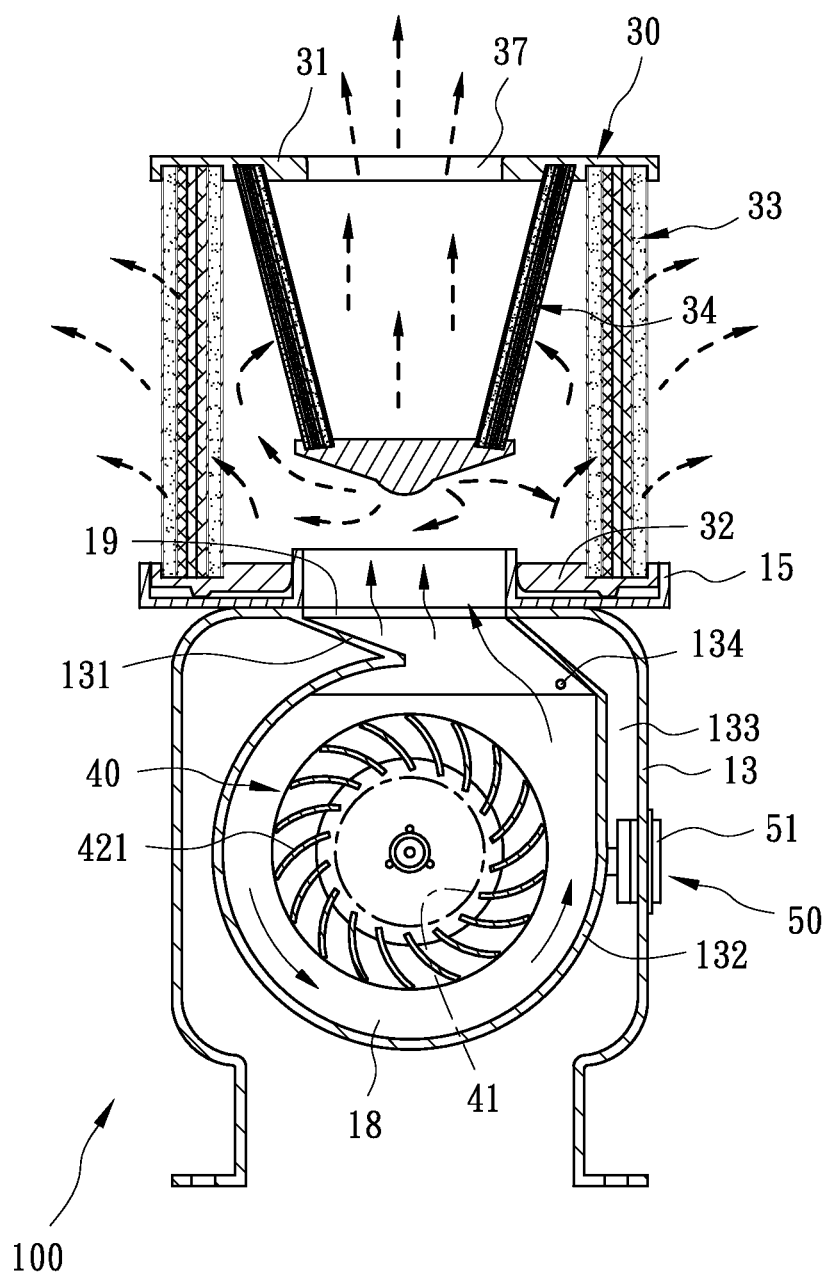
FIG. 3 is another cross sectional view showing the assembly of the oil mist collector according to the first embodiment of the present invention.

Referring to FIGS. 2 and 3, the casing unit 10 includes a first cap 11, a first box 12 connected with the first cap 11, a second box 13 proximate to the first box 12, a second cap 14 disposed on a rear end of the second box 13, and a holder 15 mounted on a top end of the second box 13, wherein the first cap 11, the first box 12, and the second box 13 define a hollow interior to accommodate an inlet 16, a first air chamber 17, a second air chamber 18, and an air guiding orifice 19 located above the second air chamber 18 and communicating with an exterior environment. The first cap 11 has the inlet 16 formed on a central portion thereof and is removed to open the first air chamber 17, thus replacing the first filtering unit 20.

The first box 12 has the first air chamber 17 formed therein, a first recycling orifice 121 arranged on a bottom end thereof and communicating with the first air chamber 17, an air baffle 122 fixed on a side wall thereof which corresponds to the second air chamber 18, and an air tube 123 extending outwardly from a central portion of the air baffle 122 to connect with the first filtering unit 20.

The second box 13 has the second air chamber 18 formed therein and has the air guiding orifice 19 located above the second air chamber 18, wherein a cross section of the second air chamber 18 is circular. The second box 13 further has a beveled plate 131 located adjacent to the air guiding orifice 19 and obliquely extending downward from the top end of the second box 13 to a top rim of the second air chamber 18 so as to shield a half of air guiding orifice 19. In this embodiment, the second box 13 further has an separation plate 132 arranged on a back side of the second air chamber 18, an accommodation room 133 defined between the separation plate 132 and the second cap 14, and an air drawing orifice 134 formed on the separation plate 132 and communicating with the second air chamber 18.

Figure 4:
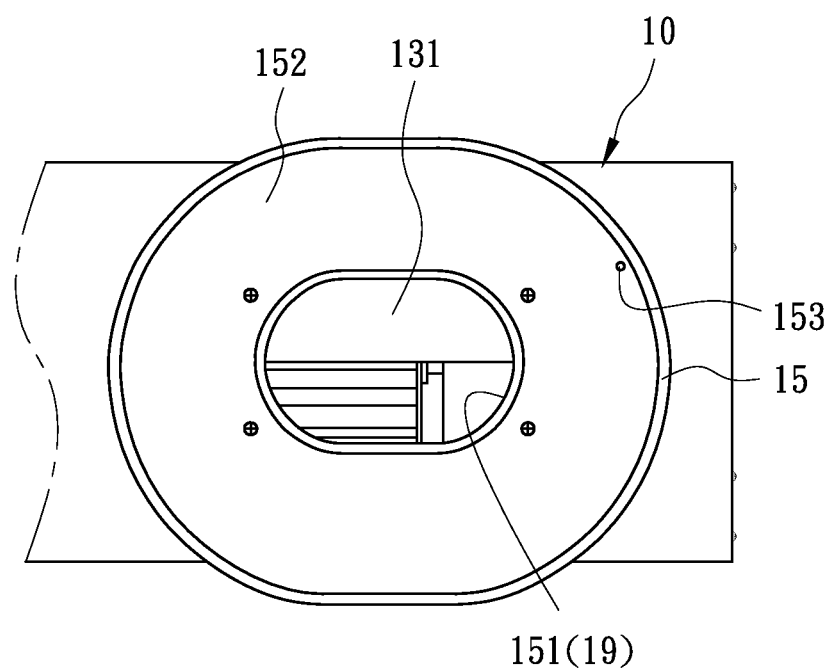
FIG. 4 is a top plan view showing the assembly of a part of the oil mist collector according to the first embodiment of the present invention.

Referring further to FIG. 4, a cross section of the holder 15 is elliptical to correspond to that of the second filtering unit 30, and the holder 15 has an oval opening 151 defined on a central position thereof and communicating with the air guiding orifice 19, a groove 152 concentric with the oval opening 151, and a second recycling orifice 153 arranged on a bottom end of the holder 15 and communicating with the groove 152.

Figure 5:
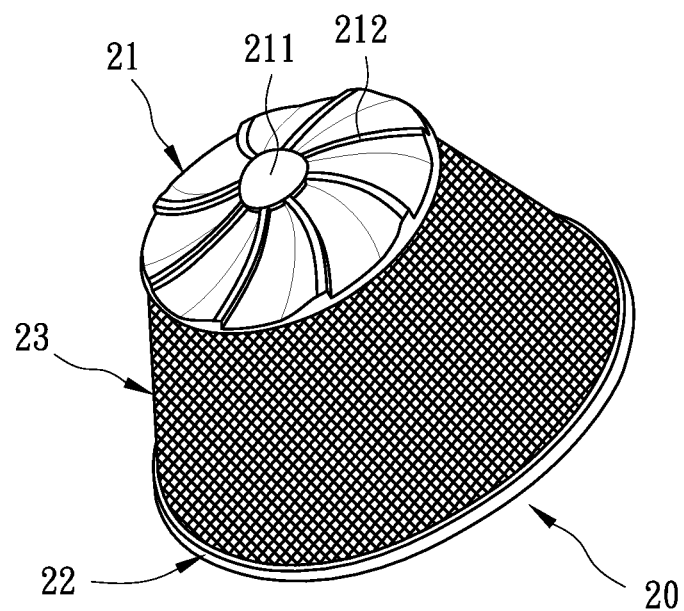
FIG. 5 is a perspective view showing the assembly of a first filtering unit of the oil mist collector according to the first embodiment of the present invention.

As shown in FIGS. 2 and 5, the first filtering unit 20 is disposed in the first air chamber 17 and is formed in a hollow cone shape, wherein the first filtering unit 20 includes an open rear end, a first lip 21 formed in an inclined cone shape, and a second lip 22 fitted with the air tube 123, wherein an outer diameter of the second lip 22 is greater than that of the first lip 21. The first filtering unit 20 further includes a first filtration assembly 23 defined between the first lip 21 and the second lip 22. In this embodiment, the first lip 21 has a collecting protrusion 211 arranged on a central position thereof and a plurality of spiral guide ribs 212 radially extending outwardly from the collecting protrusion 211. The second lip 22 has a through hole formed thereon to fit the second lip 22 with the air tube 123, such that the first filtering unit 20 is mounted in the first air chamber 17 securely. In addition, the first filtration assembly 23 has an outer mesh made of metal, an air mesh, a deposition mesh, a connection mesh, a rhombus layer mesh, an oil water separating layer, and an inner mesh.

The second filtering unit 30 is fixed on the holder 15 and is formed in a hollow cylinder shape, wherein the second filtering unit 30 includes an open rear end, a third lip 31 with a noncircular cross section, a fourth lip 32 retained into the groove 152, a second filtration assembly 33 defined between the third lip 31 and the fourth lip 32, a third filtration assembly 34 surrounded by the second filtration assembly 33 in the second filtering unit 30 and fixed in the second filtering unit 30 and connected with the third lip 31, and an outlet 37 defined on a central position of the third lip 31. In this embodiment, a cross section of the second filtering unit 30 is oval. Due to the second filtration assembly 33 and the third filtration assembly 34 have a similar structure to that of the first filtration assembly 23 of the first filtering unit 20, further remarks are omitted.

The ventilation unit 40 includes a motor 41 mounted in the accommodation room 133, a rotary fan 42 rotatably connected with the motor 41 and secured in the second air chamber 18, wherein the rotary fan 42 is coaxial with the first filtering unit 20 and has plural fan blades 421 equidistantly arranged thereon. In this embodiment, a direction of an inclination angle of the beveled plate 131 is the same as a rotating direction of the rotary fan 42, so when the rotary fan 42 rotates, a wind pressure generated by rotating the rotary fan 42 is guided into the second filtering unit 30 smoothly by ways of the inclination angle of the beveled plate 131, and an air ventilation is not stopped by a back pressure which is produced by rotating the rotary fan 42.

The pressure indicator 50 includes an indicating portion 51 arranged on a front end thereof and includes a drawing tube 52 joined with the air drawing orifice 134 of the second air chamber 18, such that the wind pressure generated by rotating the rotary fan 42 of the ventilation unit 40 is displayed by the indicating portion 51 to sense a flow speed and flow rate of oil mist in the second air chamber 18, thus judging obstruction of the first filtering unit 20 and the second filtering unit 30.

Thereby, after starting the motor 41 to drive the rotary fan 42 to rotate, a centrifugal wind pressure produces to guide the oil mists, dusts, and waste gases in the factory into the first air chamber 17 from the inlet 16, and the plurality of spiral guide ribs 212 of the first lip 21 of the first filtering unit 20 facilitate revolving air flow in the first air chamber 17 to stop a part of the oil mists and the dusts, and the through hole of the second lip 22 facilitates exhausting the waste gases and reducing air resistance and pressure loss, such that a part of the oil mists and the waste gases are filtered by the first filtration assembly 23 of the first filtering unit 20 and then the others of the oil mists flow into the second air chamber 18 via the through hole of the second lip 22. Thereafter, the rotary fan 42 pumps the others of the oil mists into the second air chamber 18 via the air guiding orifice 19, such that the air flow is guided evenly and air resistance of the second filtration assembly 33 and the third filtration assembly 34 is reduced by using an oval cross section of the second filtering unit 30. In other words, the second filtering unit 30 enhances 20% of filtration area more than a conventional filtration cylinder formed in a circle shape. Finally, clean and fresh air is exhausted out of the second filtering unit 30.

In operation of the ventilation unit 40, the oil mists and water drops located in the first air chamber 17 and attaching on the first lip 21 and the first filtration assembly 23 of the first filtering unit 20 fall onto a bottom end of the first air chamber 17, and the others of the oil mists in the second filtering unit 30 flow into the groove 152 of the holder 15, thereafter all oil mists, water drops, and greases in the oil mist collector are exhausted out of the casing unit 10 through the first recycling orifice 121 and the second recycling orifice 153, and then they are collected and recycled by a first pipe 60 and a second pipe 61.

Accordingly, the oil mist collector of the present invention has advantages as follows:

1. Since the air guiding orifice is located above the second air chamber and communicates with the second filtering unit 30, the others of the oil mists are pumped upwardly into the second filtering unit 30 from the second air chamber 18 smoothly. In other words, a flowing path of the air flow in the casing unit 10 is shorten greatly to reduce the air resistance and the pressure loss, thus causing smooth exhaustion and high recycling to the oil mists.

2. The first filtering unit 20 is formed in the hollow cone shape and has the open rear end to increase filtration area, and the second lip 22 has the through hole to facilitate exhausting the waste gases and reducing the air resistance and the pressure loss, thus accelerating the flow speed and flow rate of the oil mist and decreasing a load capacity of the motor 41.

3. The wind pressure in the casing unit 10 is displayed by the indicating portion 51 of the pressure indicator 50 to sense the flow speed and the flow rate of the oil mist in the second air chamber 18, thus judging the obstruction of the first filtering unit 20 and the second filtering unit 30 to replace or clean the first filtering unit 20 and the second filtering unit 30.

Figure 6:
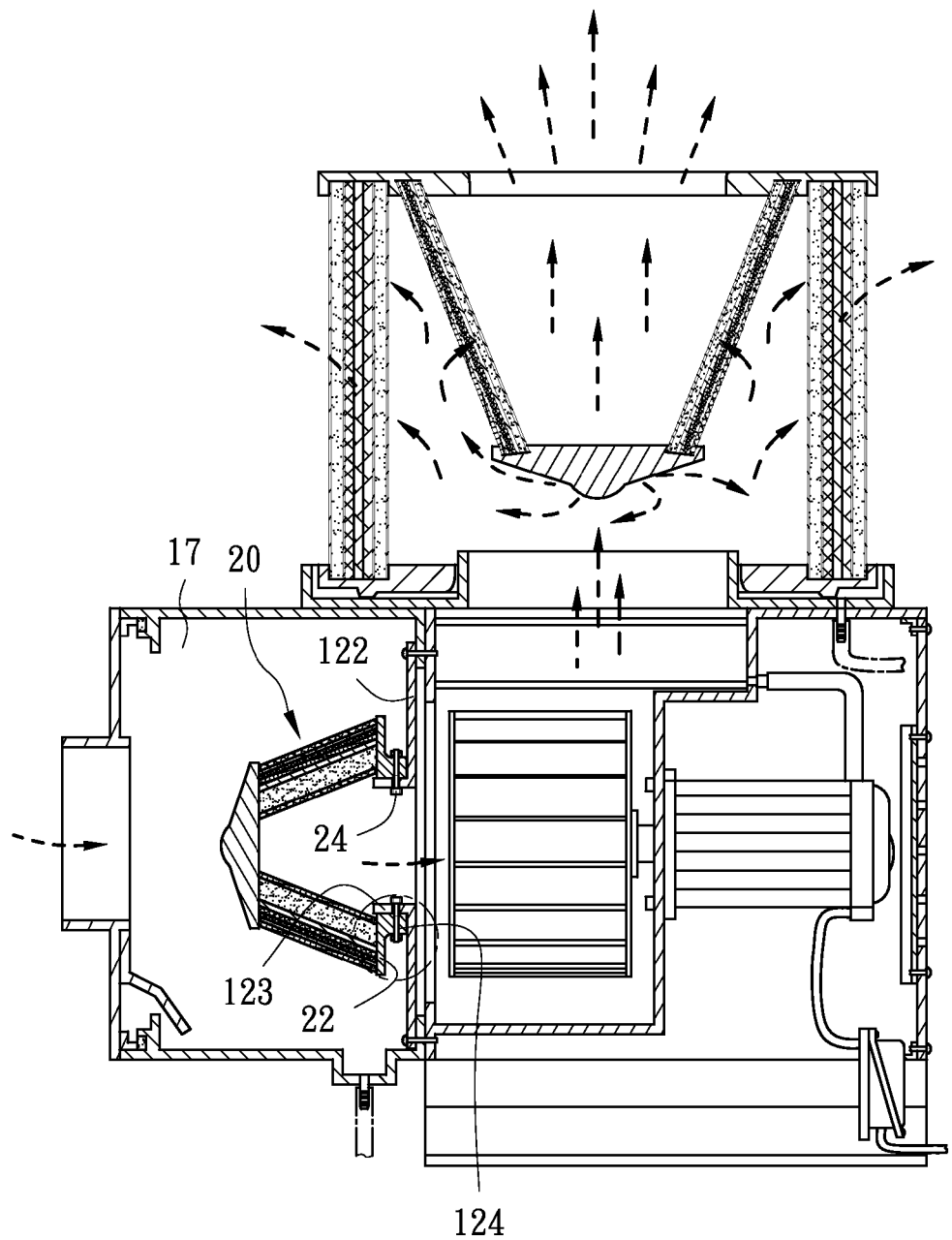
FIG. 6 is a cross sectional view showing the assembly of an oil mist collector according to a second embodiment of the present invention.
Figure 7:
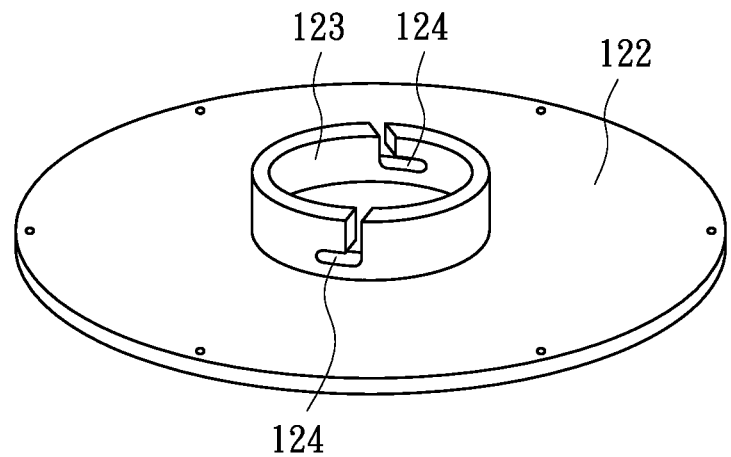
FIG. 7 is a perspective view showing the assembly of an air baffle of the oil mist collector according to the second embodiment of the present invention.
Figure 8:
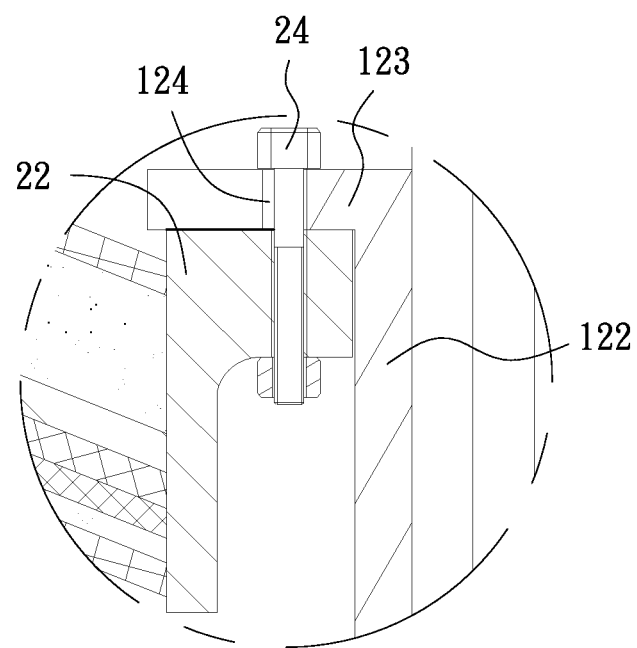
FIG. 8 is an amplified cross sectional view showing a portion of FIG. 6 marked by dashed lines.

Referring further to FIGS. 6 to 8, the first filtering unit 20 is disposed in the first air chamber 17 in a rotatable connecting manner according to a second embodiment of the present invention, wherein an air tube 123 has a plurality of L-shaped slots 124 formed on a peripheral wall thereof, and a first filtering unit 20 includes plural locking elements 24 arranged on a second lip 22 thereof, wherein each locking element 24 is a screw bolt and its central axis is perpendicular to a center of the second lip 22, such that each locking element 24 is rotatably screwed with each L-shaped slot 124, and the second lip 22 of the first filtering unit 20 is connected with an air baffle 122 tightly to fix the air tube 123 securely.

Figure 9:
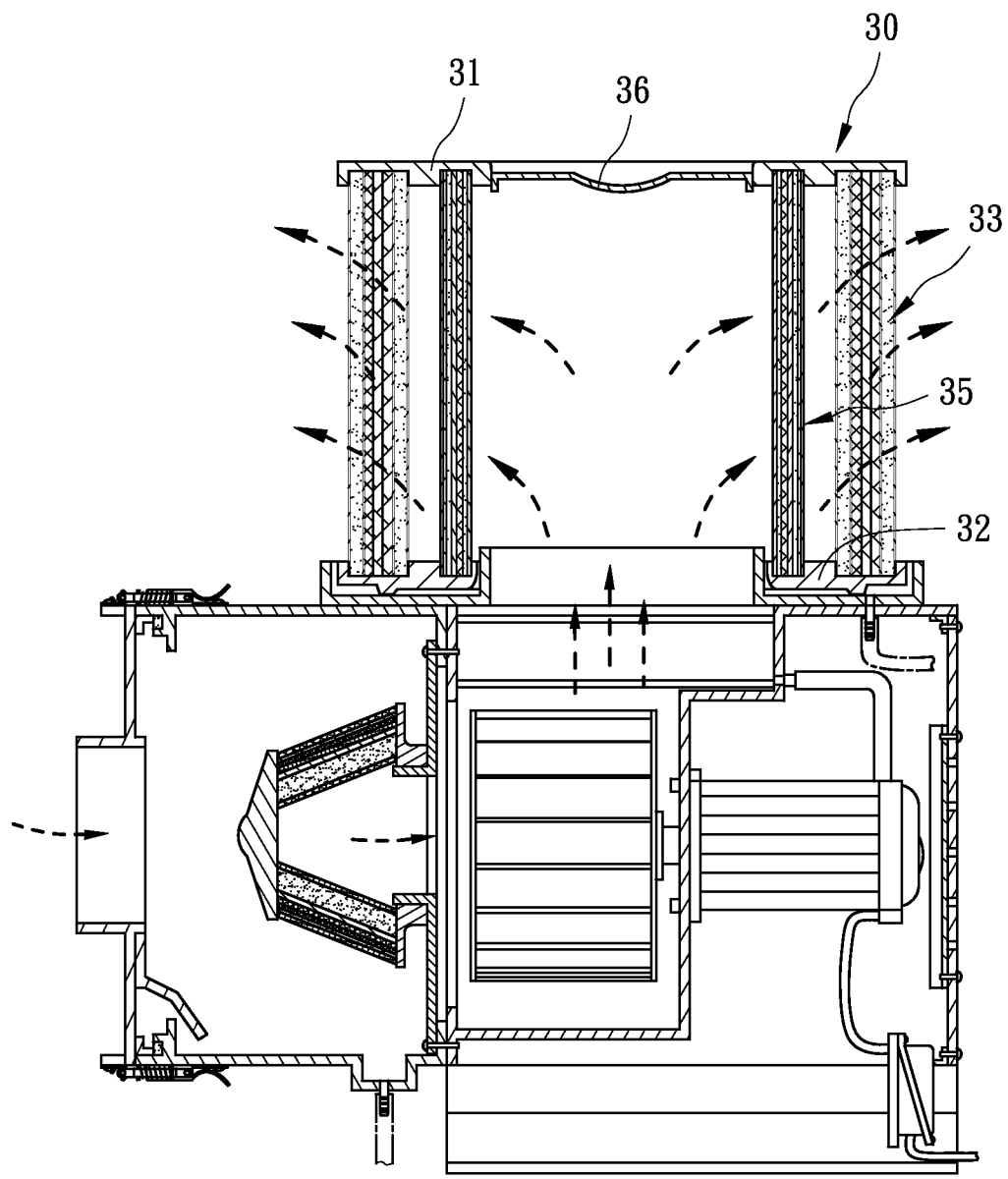
FIG. 9 is a cross sectional view showing the assembly of an oil mist collector according to a third embodiment of the present invention.

As shown in FIG. 9, in a third embodiment, a second filtering unit 30 includes a second filtration assembly 33 and a third filtration assembly 35 surrounded by the second filtration assembly 33 in the second filtering unit 30, wherein the second filtration assembly 33 is parallelly defined between a third lip 31 and a fourth lip 32, and each of the second filtration assembly 33 and the third filtration assembly 35 has a plurality of filter layers, wherein the third lip 31 is covered by a cover 36, hence the second filtration assembly 33 and the third filtration assembly 35 filter oil mists, dusts, and waste gases.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An oil mist collector comprising:
a casing unit including an inlet, a first air chamber, a second air chamber, an air guiding orifice corresponding to the second air chamber and communicating with an exterior environment, and a first recycling orifice arranged on a bottom end thereof and communicating with the first air chamber;
a first filtering unit disposed in the first air chamber and corresponding to the inlet;
a second filtering unit fixed above the air guiding orifice and formed in a hollow cylinder shape, wherein the second filtering unit includes an open rear end, a first lip with a noncircular cross section, a second lip, and a first filtration assembly defined between the first lip and the second lip;
a ventilation unit including a motor and a rotary fan rotatably connected with the motor and secured in the second air chamber;
wherein the casing unit further includes a holder mounted on a top end thereof and corresponding to the air guiding orifice to hold the second filtering unit;
wherein the holder has a groove and a second recycling orifice arranged on a bottom end thereof and communicating with the groove.

2. The oil mist collector as claimed in claim 1, wherein the casing unit also includes a first box and a second box proximate to the first box, the first air chamber is formed in the first box, and the second air chamber is formed in the second box.

3. The oil mist collector as claimed in claim 2, wherein the first box of the casing unit has a first cap connected therewith, and the inlet is formed on the first cap.

4. The oil mist collector as claimed in claim 2, wherein the second box further has a beveled plate located adjacent to the air guiding orifice, and a direction of an inclination angle of the beveled plate is the same as a rotating direction of the rotary fan.

5. The oil mist collector as claimed in claim 1, wherein the second air chamber of the casing unit is hollow, and a cross section of the second air chamber is circular.

6. The oil mist collector as claimed in claim 1, wherein the first filtering unit is formed in a hollow cone shape and includes an open rear end, a third lip, a fourth lip and a second filtration assembly defined between the third lip and the fourth lip.

7. The oil mist collector as claimed in claim 6, wherein the second filtration assembly has an outer mesh made of metal, an air mesh, a deposition mesh, a connection mesh, a rhombus layer mesh, an oil water separating layer, and an inner mesh.

8. The oil mist collector as claimed in claim 6, wherein the third lip is formed in an inclined cone shape and has a collecting protrusion arranged on a central position thereof, the first lip also has a plurality of spiral guide ribs radially extending outwardly from the collecting protrusion.

9. The oil mist collector as claimed in claim 6, wherein the casing unit further includes an air baffle located in the first air chamber, and the air baffle has an air tube extending outwardly from a central portion thereof and being coaxial with the rotary fan, wherein the air tube has a plurality of L-shaped slots formed on a peripheral wall thereof, the first filtering unit further includes plural locking elements arranged on the fourth lip thereof, and each locking element is rotatably screwed with each L-shaped slot so that the first filtering unit is disposed in the first air chamber.

10. The oil mist collector as claimed in claim 1, wherein a cross section of the second filtering unit is oval.

11. The oil mist collector as claimed in claim 1, wherein the second filtering unit further includes a third filtration assembly surrounded by the first filtration assembly in the second filtering unit, and the third filtration assembly is fixed in the second filtering unit and connected with the first lip.

12. The oil mist collector as claimed in claim 1 further comprising a pressure indicator, and the pressure indicator including an indicating portion arranged on a front end thereof, the pressure indicator also including a drawing tube joined with the second air chamber, such that obstruction of the first filtering unit and the second filtering unit is judged by using the pressure indicator.

13. The oil mist collector as claimed in claim 2, wherein the casing unit further includes a second cap disposed on a rear end of the second box, and an accommodation room is defined between a separation plate on a back side of the second air chamber and the second cap to accommodate the motor.

\* \* \* \* \*